(12) United States Patent
Sullivan

(10) Patent No.: US 8,427,826 B2
(45) Date of Patent: Apr. 23, 2013

(54) COMPUTER DOCKING STATION ASSEMBLY

(75) Inventor: Chad Sullivan, Wisconsin Rapids, WI (US)

(73) Assignee: L&P Property Management Company, South Gate, CA (US)

( * ) Notice: Subject to any disclaimer, the term of this patent is extended or adjusted under 35 U.S.C. 154(b) by 346 days.

(21) Appl. No.: 12/955,469

(22) Filed: Nov. 29, 2010

(65) Prior Publication Data

US 2012/0134102 A1 May 31, 2012

(51) Int. Cl.
*G06F 1/16* (2006.01)

(52) U.S. Cl.
USPC .............. 361/679.43; 248/346.06; 710/306; 455/422.1; 439/544

(58) Field of Classification Search .................. 343/765, 343/702; 361/679.41, 679.43, 679.55, 679.27, 361/679.44, 679.4, 679.03, 679.29, 679.02, 361/679.33, 679.47, 679.37, 679.42, 679.26; 248/560, 544, 638, 570, 288.11, 125.8, 161; 248/346.06; 267/136, 148; 710/303, 304, 710/100, 48, 69, 260, 261, 316, 306, 314; 455/556.1, 566, 573, 90.1, 557, 414.1, 422.1, 455/556.2; 439/135, 488, 541.5, 347, 248; 439/131, 157, 341, 59, 92, 544, 552, 824; 711/1, 106, 122, 170
See application file for complete search history.

(56) References Cited

U.S. PATENT DOCUMENTS

| | | | |
|---|---|---|---|
| 5,477,415 A | 12/1995 | Mitcham et al. |
| 5,592,362 A | 1/1997 | Ohgami et al. |
| 5,704,212 A | 1/1998 | Erler et al. |
| 5,738,537 A | 4/1998 | Setoguchi et al. |
| 5,757,616 A | 5/1998 | May et al. |
| 5,768,101 A | 6/1998 | Cheng |
| 5,790,375 A | 8/1998 | Lee |
| 5,870,283 A | 2/1999 | Maeda et al. |
| 5,933,321 A | 8/1999 | Ruch et al. |
| 5,995,366 A | 11/1999 | Howell et al. |
| 6,034,869 A | 3/2000 | Lin |
| 6,151,218 A | 11/2000 | Pirdy et al. |
| 6,185,095 B1 | 2/2001 | Helot et al. |
| 6,189,349 B1 | 2/2001 | Helot et al. |
| 6,236,571 B1 | 5/2001 | Dohi et al. |

(Continued)

OTHER PUBLICATIONS

International Electrochemical Commission—International Standard for Degrees of Protection Provided by Enclosures (IP Code)—Edition 2.1, 2001.

(Continued)

*Primary Examiner* — Hung Duong
(74) *Attorney, Agent, or Firm* — Michael Best & Friedrich LLP

(57) ABSTRACT

A computer docking station includes a wall having a first surface, a second surface, and an aperture extending through the wall. A securing member has a body portion configured to be positioned adjacent the first surface of the wall, and a securing projection coupled to the body portion. The securing projection is sized and configured to selectively extend through the aperture in the wall, beyond the second surface, and into a securement recess of a computer to secure the computer to the docking station. An adjustment mechanism is coupled with the body portion of the securing member and is operable to move the securing member relative to the wall between a first position, in which the securing projection is positioned to extend into a securement recess of the computer, and a second position, in which the securing projection is positioned to not extend into the securement recess.

32 Claims, 9 Drawing Sheets

U.S. PATENT DOCUMENTS

| | | | |
|---|---|---|---|
| 6,275,378 B1 | 8/2001 | Lee et al. | |
| 6,331,934 B1 | 12/2001 | Helot et al. | |
| 6,362,959 B2 | 3/2002 | Tracy | |
| 6,418,013 B1 | 7/2002 | Broder et al. | |
| 6,560,103 B1 | 5/2003 | Dohi et al. | |
| 6,574,102 B2 | 6/2003 | Usui et al. | |
| 6,606,243 B2 | 8/2003 | Kamimaki et al. | |
| 7,298,611 B1 * | 11/2007 | Carnevali | 361/679.55 |
| 7,940,522 B2 * | 5/2011 | Solomon et al. | 361/679.41 |
| 2009/0043936 A1 | 2/2009 | Yang et al. | |
| 2009/0161303 A1 | 6/2009 | Hirota | |
| 2009/0213536 A1 * | 8/2009 | Lewandowski et al. | 361/679.43 |
| 2010/0002371 A1 | 1/2010 | Lee | |

OTHER PUBLICATIONS

Admitted Prior Art—published at least as early as Nov. 28, 2009, Gamber Johnson General Dynamics Itronix Duo-Touch Docking Stations brochure, with Statement of Relevance.

Admitted Prior Art—published at least as early as Nov. 28, 2009, Gamber Johnson NP-ISO-20 Shock/Vibration Isolator Plates brochure, with Statement of Relevance.

Admitted Prior Art—published at least as early as Nov. 28, 2009, Helical Isolator product sheet, Vibration Mounting & Controls, Inc. Catalog, pp. 11-17.

* cited by examiner

COMPUTER DOCKING STATION ASSEMBLY

BACKGROUND

The present invention relates to computer docking stations.

Computers are being used increasingly in rugged applications, such as military applications, that require the computer to be securely mounted in vehicles that routinely travel off-road, and in harsh terrains and environments.

SUMMARY

The present invention provides a docking station well-suited for such rugged applications. An improved securing system is designed for quick and easy positive securing of the computer to the docking station, even by a user wearing gloves. When the computer is removed from the docking station, a removable cover can be sealingly positioned over the docking station's electrical connector to protect the connector from debris and contaminants present in the harsh environment. An improved isolator assembly helps to isolate the docking station, and therefore the computer, from deep shock experienced by the vehicle.

In one embodiment, the invention provides a computer docking station for supporting and electrically coupling to a portable computer. The computer docking station includes a wall having a first surface, a second surface facing oppositely from the first surface, and an aperture extending through the wall from the first surface to the second surface. A securing member has a body portion configured to be positioned adjacent the first surface of the wall, and a securing projection coupled to the body portion. The securing projection is sized and configured to selectively extend through the aperture in the wall, beyond the second surface of the wall, and into a securement recess of the computer to secure the computer to the docking station. An adjustment mechanism is coupled with the body portion of the securing member and is operable to move the securing member relative to the wall between a first position, in which the securing projection is positioned to extend into the securement recess of the computer, and a second position, in which the securing projection is positioned to not extend into the securement recess of the computer.

In another embodiment the invention provides a computer docking station for supporting and electrically coupling to a portable computer. The computer docking station includes a base, an electrical connector coupled to the base and configured to electrically connect to the portable computer, and a cover removably connected to the base to selectively cover the electrical connector. The cover sealingly engages the base around the electrical connector to substantially prevent the ingress of contaminants toward the electrical connector between the base and the cover.

The invention further provides an isolator assembly for use with a computer docking station. The isolator assembly includes a first plate configured to be coupled to a support surface, a second plate configured to be coupled to the computer docking station, and a wire rope isolator coupled between the first and second plates to reduce transmission of forces from the first plate to the second plate.

The invention also provides a computer docking station assembly for supporting and electrically coupling to a portable computer. The computer docking station assembly includes a docking station having a base configured to support and electrically couple to the portable computer, and an isolator assembly including a first plate configured to be coupled to a support surface, a second plate spaced apart from the first plate and configured to be removably coupled to the computer docking station, and an isolator mechanism disposed between the first plate and the second plate to reduce transmission of forces from the first plate to the second plate. The computer docking station assembly further includes a fastener that removably couples the base to the second plate. The fastener is configured to be removed from the base and the second plate so that the base can be uncoupled from the second plate without uncoupling the first plate from the support surface.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
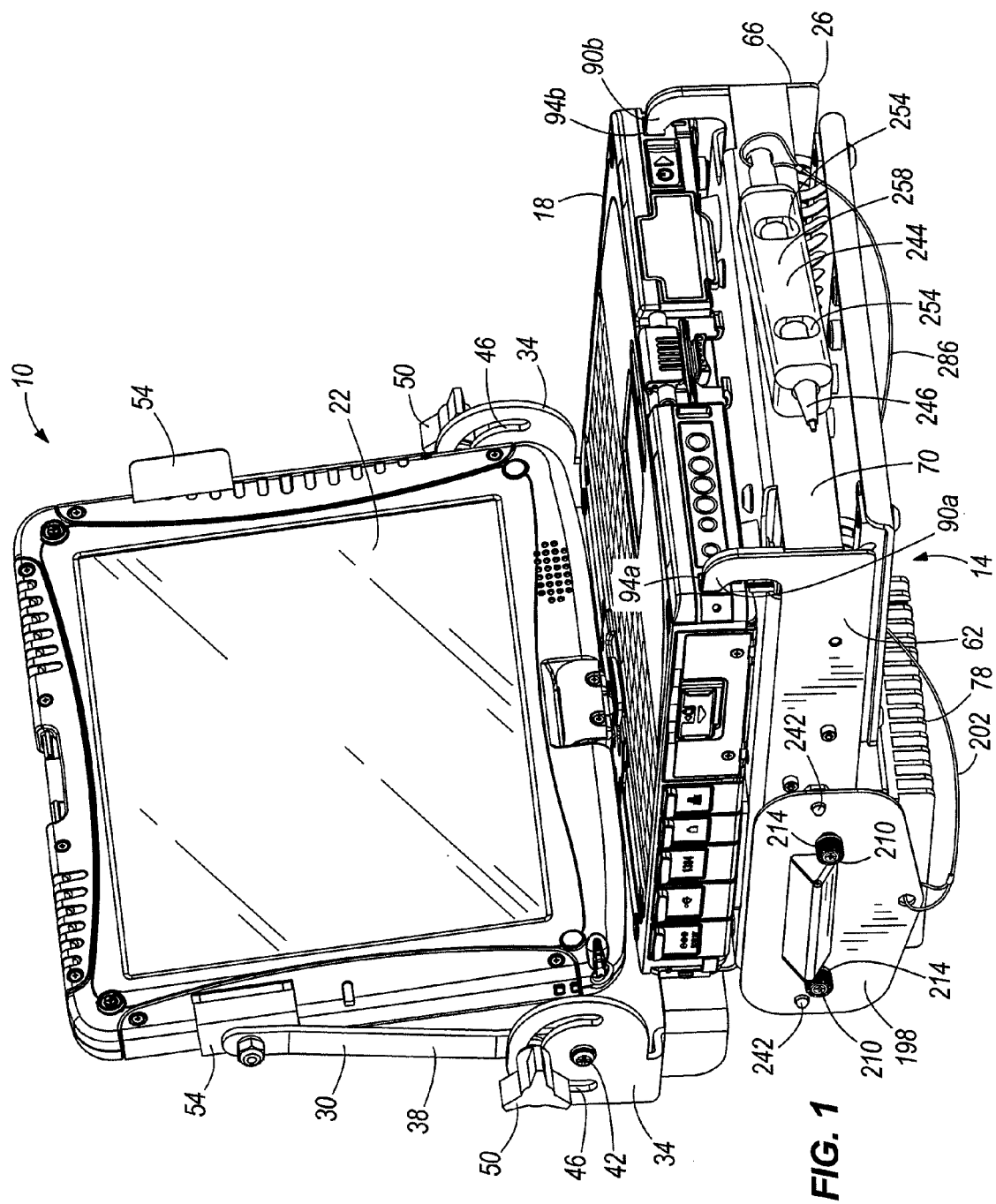
FIG. 1 is a front perspective view of a docking station shown with a computer docked thereto.

FIG. 1 illustrates a portable computer 10 docked in a docking station 14 of the present invention. The illustrated portable computer 10 is a notebook-style portable computer having a base portion 18 and a cover or monitor portion 22 pivotally coupled with the base portion 18 in a conventional manner. One example of such a portable notebook-style computer 10 is the Panasonic Toughbook CF-19 computer.

The docking station 14 is operable to support and electrically couple to the computer 10. The docking station 14 can be mounted virtually anywhere the computer might be used, including in a room or in a vehicle. Additionally, the docking station 14 can be mounted on a movable cart, desk, or the like to render the computer 10 mobile even when docked in the docking station 14. Various mounting hardware (not shown) can be used to secure the docking station 14 in the appropriate manner to a support surface 24 (see FIG. 10). The illustrated docking station 14 is designed for use in rugged environments, such as in off-road and military vehicles (e.g., Humvees, tanks, boats, etc.), and/or in locations where the environment is harsh (e.g., dusty environments, wet environments, etc.).

Figure 2:
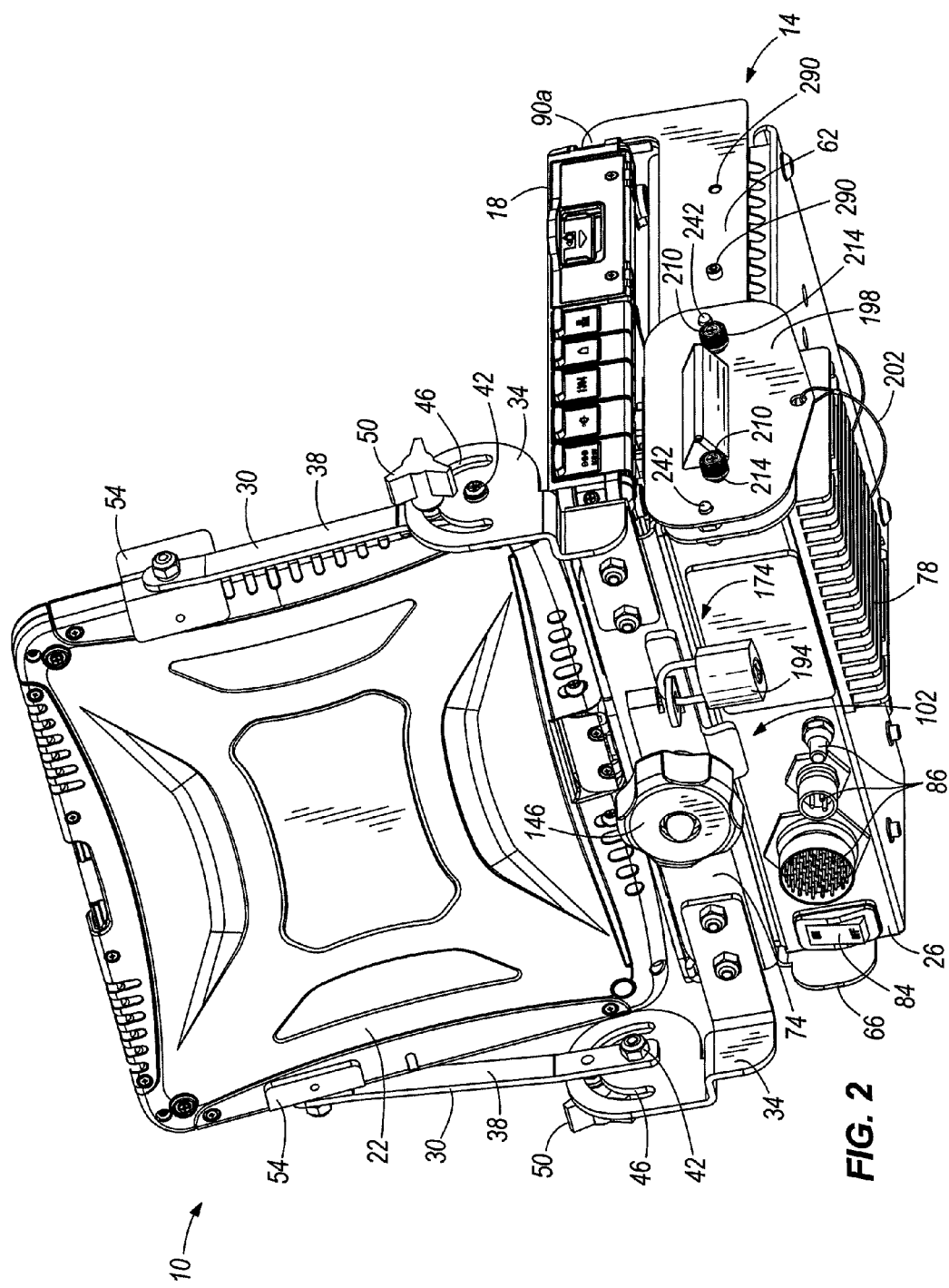
FIG. 2 is a rear perspective view of the docking station and computer of FIG. 1.

The docking station 14 includes a platform or base 26 and optional support arms 30 coupled to the base 26 for supporting the monitor portion 22 of the computer 10 when it is in the open position as shown in FIGS. 1 and 2. The support arms 30 can be adjustable to vary the position at which the monitor portion 22 is supported in an opened position. In the illustrated embodiment, each support arm 30 includes a base portion 34 removably coupled to the base 26 of the docking station 14 and an extension arm 38 movably coupled to the base portion 34. A fastener 42 pivotally secures the extension arm 38 to the base portion 34. The base portion 34 includes an arcuate aperture 46 centered about the fastener 42. An adjustment knob assembly 50 is coupled with the extension arm 38 and extends through the arcuate aperture 46. The knob assembly 50 can be loosened to allow the extension arm 38 to be rotated about the fastener 42 relative to the base portion 34 to a desired angular position for supporting the monitor portion 22. A support member 54 is coupled to the distal end of the extension arm 38 to grip and support the edge of the monitor portion 22 as shown. With the monitor portion 22 positioned in the desired position and the support member 54 coupled to the monitor portion 22, the knob assembly 50 can be tightened to secure the extension arm 38 in the desired angular position relative to the base portion 34. The optional support arms 30 can be useful for supporting the monitor portion 22 in its opened position when the docking station 14 is mounted in a vehicle that is used off-road in rugged terrain.

Figure 3:
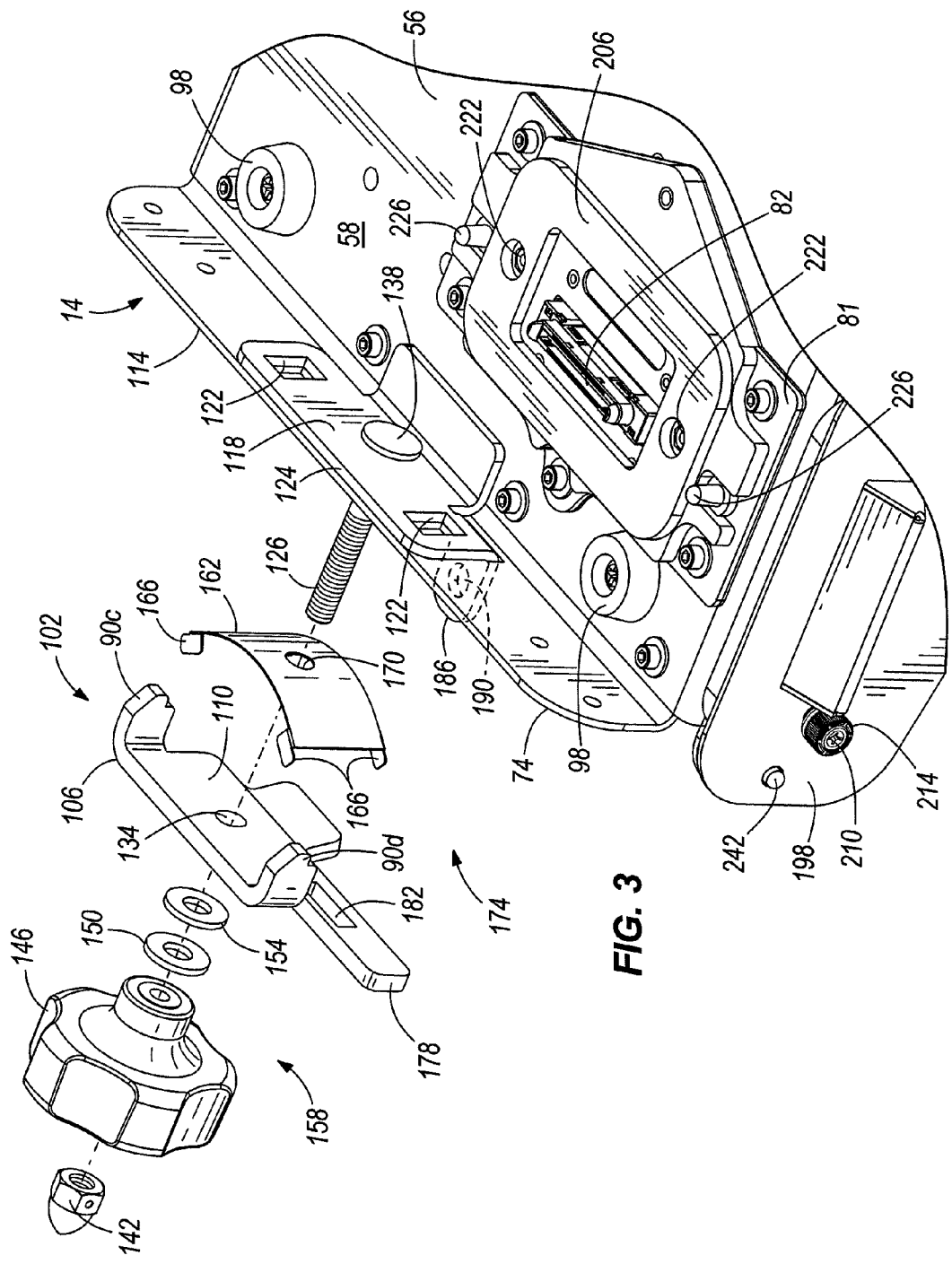
FIG. 3 is a partially exploded view of the docking station of FIG. 1.

With reference to FIGS. 1-3, the base 26 of the docking station 14 includes, in the illustrated embodiment, a generally horizontal wall 56 having a top surface 58 (see FIG. 3), left and right sidewalls 62, 66, respectively, depending downwardly and generally perpendicularly from the horizontal wall 56, a front wall 70 depending downwardly and generally perpendicularly from the horizontal wall 56, and a rear wall 74 extending upwardly and generally perpendicularly from the horizontal wall 56. As used herein and in the appended claims, the terms horizontal, vertical, top, bottom, right, left, front, rear, upper, lower, upwardly, downwardly and other directional terms are not intended to require any particular orientation, but are instead used for purposes of description only. The illustrated base 26 can be formed by a stamping process or any other suitable process. The base 26 defines a chamber underneath the generally horizontal wall 56 and between the left, right, and front walls 62, 66, 70 that receives an electronics module 78 of the docking station 14.

The electronics module 78 is configured to provide power to the computer 10 and to provide various electronic interfacing between the computer 10 and other devices (not shown). The electronics module 78 has an internal power supply that has an 18V to 32V input, and circuit boards and flex circuits that work with both the power supply and the computer 10. As shown in FIG. 3, an electrical connector 82 extends from the generally horizontal wall 56 for electrically connecting the computer 10 to the docking station 14, and more specifically to the electronics module 78. An access and connection plate assembly 81 can be coupled with the top surface 58 in the vicinity of the electrical connector 82, and is deemed to be part of the top surface 58 of the base 26. As shown in FIG. 2, the electronics module 78 also includes an on/off switch 84 and various military rated input/output connectors 86 (only some of which are shown—e.g., video, USB, Ethernet, audio, and RS232). The electronics module 78 is grounded to help prevent EMI radiant emissions.

The computer is securely and releasably connected to the base 26 of the docking station via a plurality of securing projections 90a-d on the base 26 that are received in corresponding securement recesses 94a-d in the computer 10. As shown in FIG. 1, two securing projections 90a and 90b extend upwardly from respective left and right sidewalls 62, 66, adjacent the front wall 70. The projections 90a and 90b are generally hook-shaped or J-shaped (an inverted J) as shown, and can be formed integrally during the stamping process, or can alternatively be separate pieces coupled to the base 26. When installing the computer 10 onto the base 26, the user first positions the computer so that the projections 90a, 90b are aligned with and received in the corresponding recesses 94a, 94b. Next, the user can pivot the rear portion of the computer 10 downwardly toward the top surface 58. By virtue of the projections 90a and 90b being received in the recesses 94a and 94b, the computer will be properly positioned and aligned so that the electrical connector 82 will be received into a mating female connector (not shown) in the underside of the base portion 18 of the computer 10. The base portion 18 of the computer will rest squarely on resilient isolators 98 coupled to the top surface 58 of the wall 56. The isolators 98 help to dampen vibrations from being passed from the docking station 14 to the computer 10.

Figure 4:
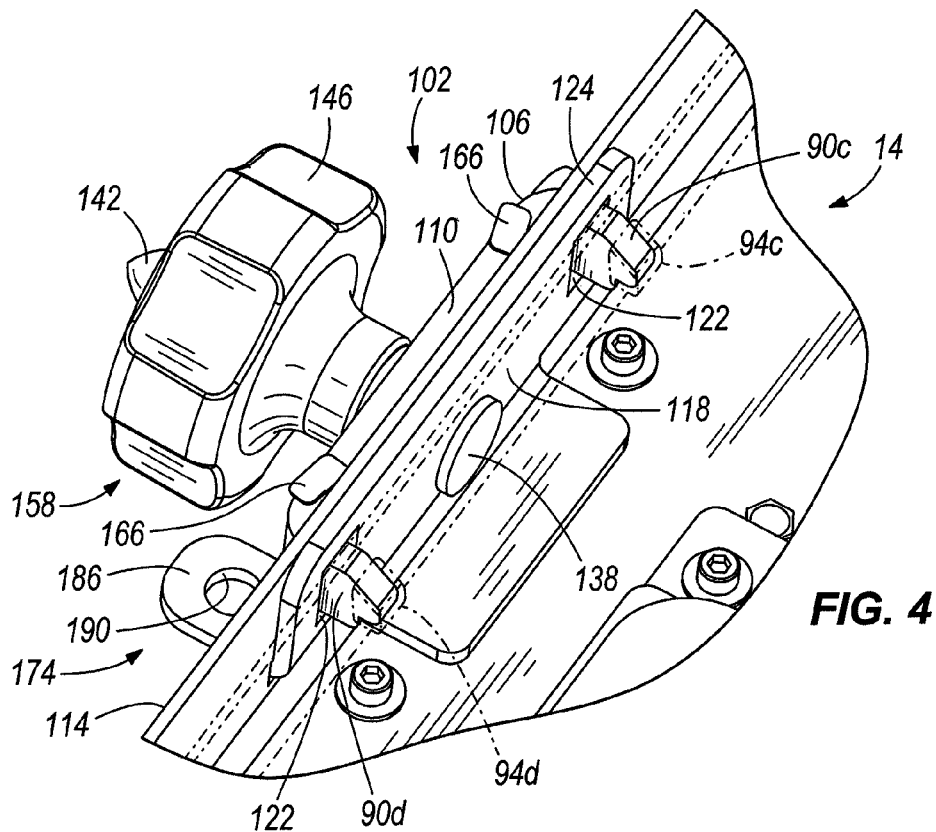
FIG. 4 is an enlarged, partial top view of the securing arrangement shown in first, secured arrangement.
Figure 5:
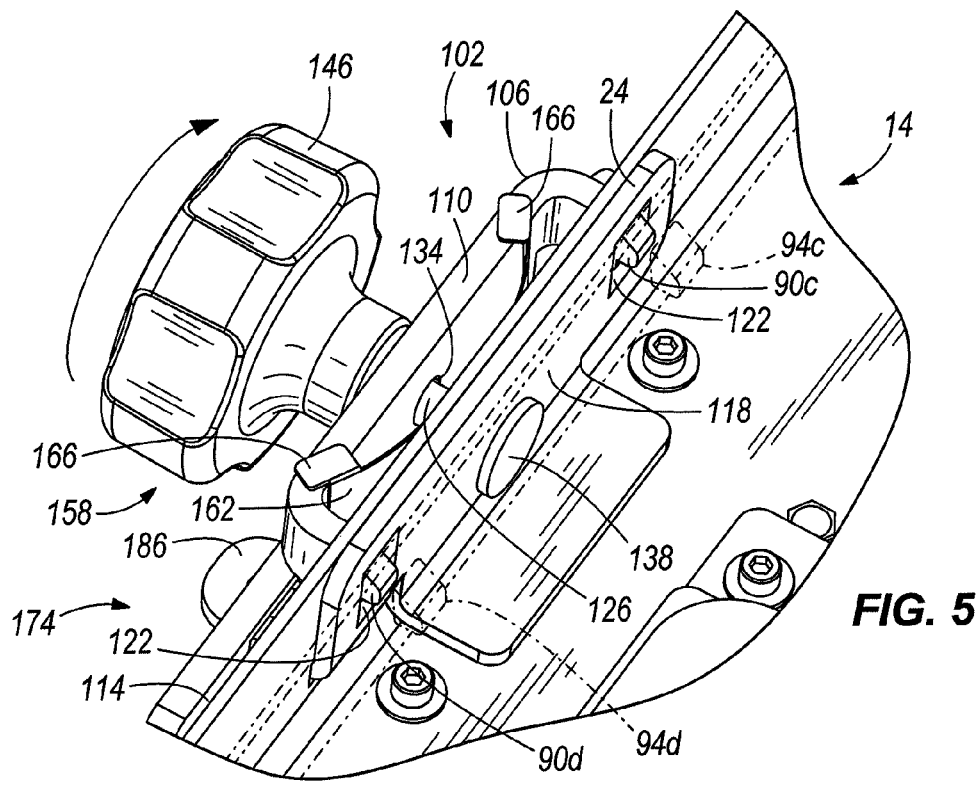
FIG. 5 is an enlarged, partial top view of the securing arrangement shown in second, unsecured arrangement.

With the base portion 18 of the computer 10 resting squarely on the isolators 98, the rear of the computer 10 can be secured to the docking station 14. To accomplish this, the docking station 14 includes a securing arrangement 102 located at the rear end of the docking station 14. As best shown in FIGS. 3-5, the illustrated securing arrangement 102 includes a securing member 106 having a generally planar body portion 110 and one or more securing projections 90c, 90d coupled to the body portion 110. In the illustrated embodiment, the securing projections 90c, 90d are generally perpendicularly oriented relative to the body portion 110 and are spaced apart from one another at substantially opposite ends of the body portion 110. The securing projections 90c, 90d are integrally formed with the body portion 110, but in other embodiments can be separate members attached to the body portion 110.

The securing member 106 is movably coupled to the rear wall 74. The rear wall 74 includes a first surface 114 facing rearwardly away from the computer 10, a second surface 118 facing forwardly toward the computer 10 and one or more apertures 122 extending through the rear wall 74 from the first surface 114 to the second surface 118. The apertures 122 are sized and configured to receive the securing projections 90c, 90d such that the securing projections 90c, 90d can selectively extend through the apertures 122, beyond the second surface 118 and into the corresponding securement recesses 94c, 94d in the computer 10 to secure the computer 10 to the docking station 14. As shown in the figures, the portion of the rear wall 74 adjacent securing member 106 and containing the apertures 122 can be thicker than a remainder of the rear wall 74 for added reinforcement. In the illustrated embodiment, a separate plate member 124 can form part of the rear wall 74.

The securing member 106 is movably coupled to the rear wall 74 via a threaded rod 126 (see FIG. 3). Still referring to FIGS. 3-5, the threaded rod 126 extends through a hole (not shown) in the rear wall 74 and through a hole 134 in the body portion 110 of the securing member 106. A stop plate 138 at one end of the rod 126 is larger than the hole in the rear wall 74 to prevent the rod 126 from moving rearwardly through the hole in the rear wall 74. A nut 142 at the other end of the rod 126 caps the rod 126. A knob 146 is rotatably mounted on the threaded rod 126 between the nut 142 and the securing member 106, and has internal threads (not shown) engageable with the threads on the rod 126. A washer 150 (see FIG. 3) abuts the knob 146 and a spacer 154 (see FIG. 3) is sandwiched between the washer 150 and the body portion 110. Together, the threaded rod 126, the knob 146 and the associated hardware define an adjustment mechanism 158 that is coupled with the body portion 110 of the securing member 106 and that is operable to move the securing member 106 relative to the rear wall 74 between a first position (see FIGS. 2 and 4), in which the securing projections 90c, 90d are positioned to extend into the securement recesses 94c, 94d of the computer 10, and a second position (see FIG. 5), in which the securing projections 90c, 90d are positioned to not extend into the securement recesses 94c, 94d of the computer 10.

The illustrated securing arrangement 102 further includes a biasing member 162 positioned between the first surface 114 of the rear wall 74 and the body portion 110 of the securing member 106 for biasing the securing member 106 toward the second, unsecured position. The illustrated biasing member 162 is a leaf spring, however, alternative biasing members (e.g., coil springs, etc.) can be substituted. In yet other embodiments, the biasing member 162 could be eliminated. The leaf spring 162 includes optional spaced-apart tabs 166 positioned at one or both ends to engage the top and bottom edges of the body portion 110 and to prevent rotation of the leaf spring 162 relative to the body portion 110. A hole 170 (see FIG. 3) in the leaf spring 162 receives the threaded rod 126 therethrough.

Starting with the securing arrangement 102 in the second, unsecured position, rotation of the knob 146 in a first, tightening direction causes the knob 146 to advance along the threaded rod 126 toward the body portion 110. Engagement from the knob 146 to the washer 150 to the spacer 154 and to the body portion 110 causes the body portion to move toward the first surface 114 of the rear wall 74, against the bias of the biasing member 162. Continued tightening of the knob 146 causes the securing projections 90c, 90d to extend through the apertures 122 in the rear wall 74, beyond the second surface 118, and eventually into the securement recesses 94c, 94d of the computer 10, thereby securing the computer 10 to the docking station 14 (see FIGS. 2 and 4). To release the computer 10 from the docking station 14, the user turns the knob 146 in the opposite, second, loosening direction. This moves the knob 146 along the rod 126 away from the body portion 110. The biasing member 162 causes the body portion 110 of the securing member 106 to move away from the rear wall 74 such that the securing projections 90c, 90d move out of the securement recesses 94c, 94d in the computer 10. The computer 10 is then free to be lifted or pivoted at its rear end, thereby disengaging the electrical connector 82 from the computer 10. Continued pivoting and manipulation removes the projections 90a and 90b from the recesses 94a and 94b so that the computer 10 is removed from the docking station 14.

The use of the knob 146 allows for easy manual manipulation of the securing arrangement 102, even by users wearing gloves and/or who are working in harsh and extreme environments. No tools are required to achieve the quick, easy, and robust securement or release of the computer 10 to or from the docking station 14. Of course, in other embodiments where a knob is not desired, a wing nut or other manually-manipulated member could be substituted. In applications where the computer 10 will not be removed and replaced often, a conventional hex-nut could be substituted.

The securing arrangement 102 also includes an optional locking arrangement 174 for locking the securing member 102 in the first, secured position. As best shown in FIG. 3, the locking arrangement 174 includes an arm 178 coupled to the securing member 106 and having a slot 182. In the illustrated embodiment, the arm 178 is integrally formed with and co-planar with the body portion 110 of the securing member 106. In other embodiments, the arm could be a separate member, and need not be co-planar with the body portion 110. The slot 182 in the arm 178 is aligned with, and sized and configured to receive a tab 186 extending from the first surface 114 of the rear wall 74. The tab 186 includes an aperture 190 sized and configured to receive a lock 194, such that when the securing member 106 is in the first position (see FIGS. 2 and 4), the tab 186 is received in the slot 182 and the aperture 190 is able to receive the lock 194 (see FIG. 2). The locked lock 194 prevents the tab 186 from being removed from the slot 182, thereby preventing movement of the securing member 106 that would otherwise permit the securing projections 90c, 90d to be removed from the recesses 94c, 94d. This locking arrangement 174, if used, can help prevent theft of the computer 10.

Figure 6:
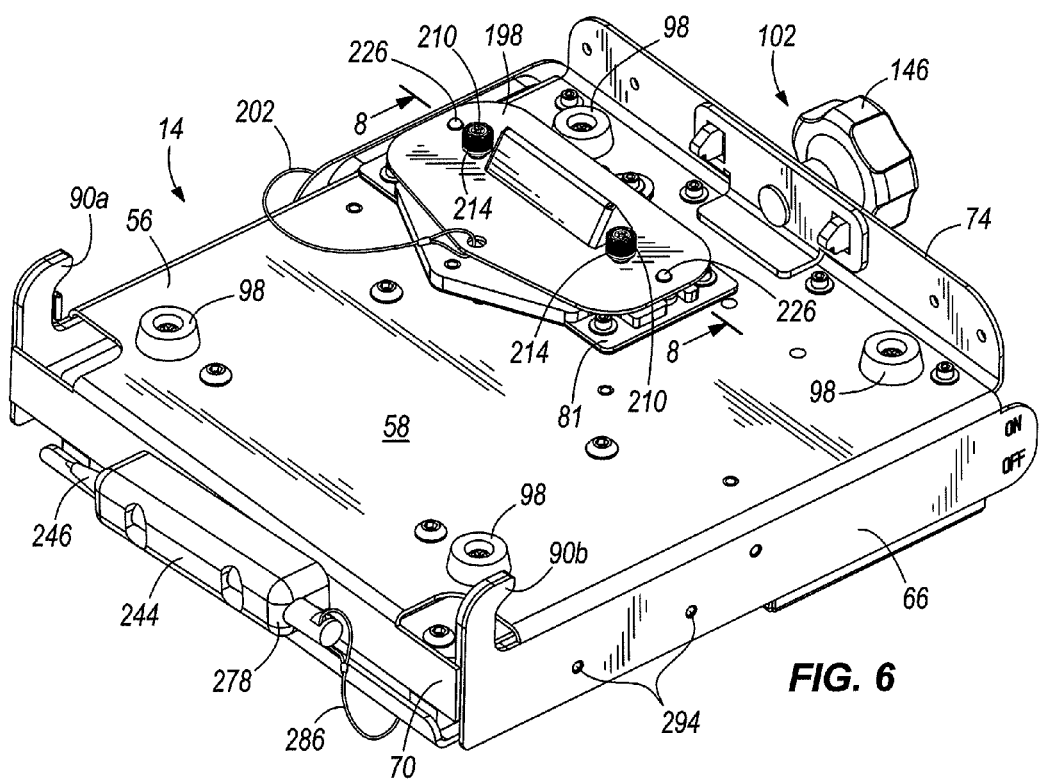
FIG. 6 is a top view of the docking station shown with a cover positioned over the electrical connector.
Figure 8:
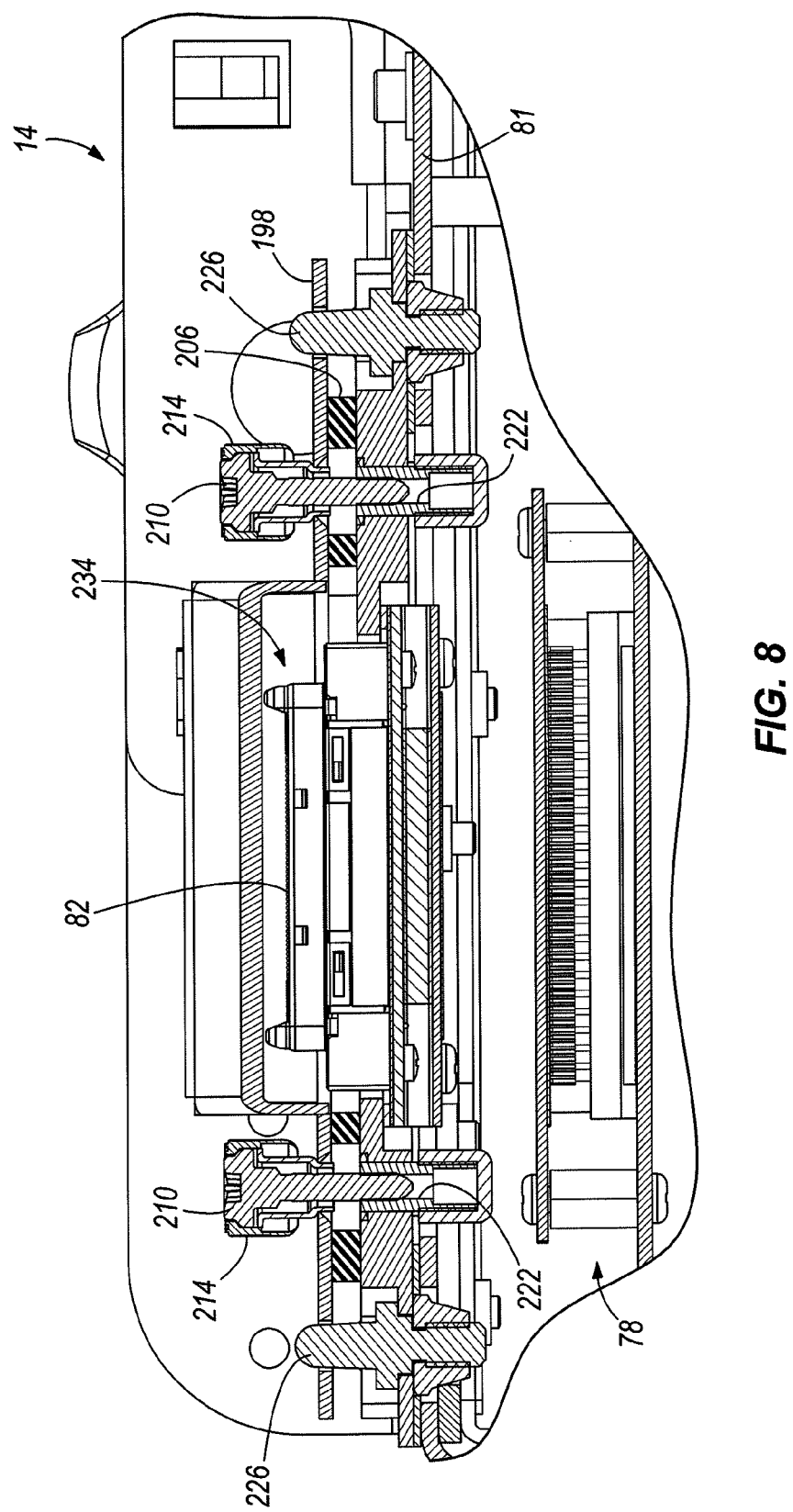
FIG. 8 is a section view taken through line 8-8 of FIG. 6.

Another feature of the docking station 14 is a cover 198 that is removably connected to the base 26 to selectively cover the electrical connector 82 when the computer 10 is not docked in the docking station 14. FIGS. 6 and 8 illustrate the cover 198 secured in place over the electrical connector 82, while FIGS. 1-3 show the cover 198 secured to the left sidewall 62 in its storage position when the computer 10 is docked in the docking station 14. Of course, the cover 198 could alternatively be stored at other locations on the left sidewall 62, the right sidewall 66, the front wall 70, or the electronics module 78. An optional lanyard or tether 202 is shown coupled between the cover 198 and the docking station 14 to help prevent loss or separation of the cover 198 from the docking station 14.

The cover 198 can be made of metal or hard plastic and is provided to protect the electrical connector 82 from being damaged when the computer 10 is not docked to the docking station 14. In addition to providing protection from impact damage, the cover 198 sealing engages the top surface 58 of the horizontal wall 56 of the base 26 around the electrical connector 82 via a gasket 206 coupled between the underside of the cover 198 and the top surface 58. In the illustrated embodiment, the gasket 206 is fixed to the top surface 58 via adhesives or via other suitable securing techniques to completely surround the electrical connector 82. In another embodiment, the gasket 206 can be fixed to the underside of the cover 198. The sealing achieved by the cover 198 when it is secured over the electrical connector 82 as shown in FIGS. 6 and 8 substantially prevents the ingress of contaminants toward the electrical connector 82 between the top surface 58 of the base 26 and the cover 198. More specifically, the sealing arrangement is designed to meet the International Electrotechnical Commission's IP65 rating for Degrees of Protection Provided by Enclosures. The IP65 rating provides dust-tight protection against the ingress of solid foreign objects, and protection from jetting water ingress, making the docking station 14 well-suited for use in harsh environments, such as desert environments and marine environments, and in vehicles where the passenger compartments are periodically washed or rinsed out with sprayed water.

Figure 7:
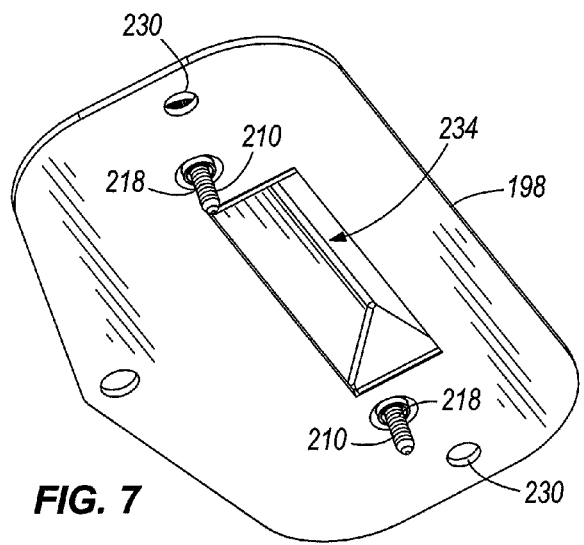
FIG. 7 is an enlarged view showing the underside of the cover.

The cover 198 includes fasteners 210 configured to cooperate with the base 26 to selectively secure the cover 198 to the base 26 in a first position (see FIGS. 6 and 8) covering the electrical connector 82. In the illustrated embodiment, the fasteners 210 are threaded fasteners coupled with the cover 198. The fasteners 210 have a knob end 214 for manual rotation by the user and a threaded end 218 (see FIG. 7) for threaded insertion into a threaded aperture 222 in the top surface 58. The fasteners 210 are secured to the cover 198 so they will not separate from the cover 198 regardless of how they are rotated. In other embodiments, different fastening arrangements can be used. The fasteners 210 can be tightened enough to securely sandwich, and likely partially deform, the gasket 206 between the cover 198 and the top surface 58 of the base 26 to achieve the seal. To facilitate alignment of the cover 198 over the electrical connector 82, the base 26 includes one or more positioning projections 226 (see FIG. 3) and the cover includes one or more corresponding guide apertures 230 (see FIG. 7). The positioning projections 226 are sized and configured to be received in the guide apertures 230 to align the cover 198 with the base 26 for properly covering the electrical connector 82. As best shown in FIGS. 7 and 8, the cover 198 defines a chamber 234 configured to at least partially receive the electrical connector 82. The chamber 234 is defined by a portion of the cover 198 that is generally V-shaped in cross-section. This inverted, V-shaped cross-section helps to deflect impact away from the electrical connector 82.

When it is desired to remove the cover 198 from the first position covering the electrical connector 82, the user unscrews the fasteners 210 until the cover 198 can be removed from over the electrical connector 82. The tether 202 remains as a means for connecting the cover 198 to the docking station 14, but is long enough to allow movement of the cover 198 to its second, storage position. As shown in FIGS. 1-3, the cover 198 can be stored on the left sidewall 62 and is secured thereto using the fasteners 210, which can be secured in threaded apertures formed in the left sidewall 62. Positioning projections 244 can be provided on the left sidewall 62 to facilitate securing the cover 198 in its second, storage position. When in its stored position, the cover 198 is out of the way of the computer 10 and will not inhibit docking the computer 10 to the docking station 14. Due to the illustrated fastening arrangement for the cover 198, it can be easily and securely mounted to the base 26 in both its horizontal, first position and its vertical, second position (i.e., in an orientation generally perpendicular to the orientation of the first position).

Figure 9:
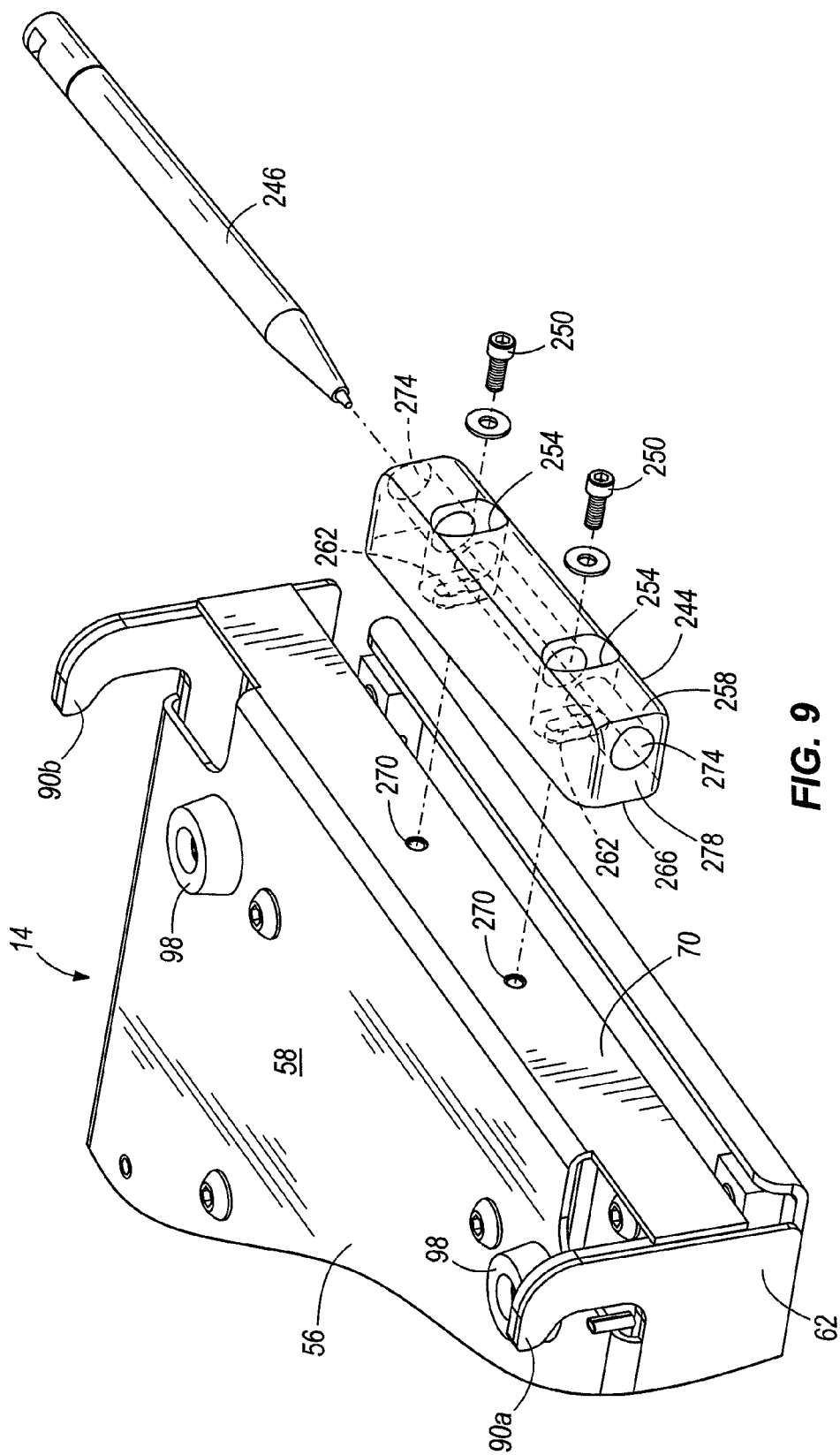
FIG. 9 is an exploded view of the stylus holder.

The docking station 14 can further include a stylus holder 244 for holding a stylus 246 usable with the computer 10. As shown in FIGS. 1 and 9, the stylus holder 244 can be mounted on the front wall 70 using fasteners 250. As shown in FIG. 9, the fasteners 250 are inserted through apertures 254 formed in a front surface 258 of the stylus holder 244, through slotted apertures 262 formed in a rear surface 266 of the stylus holder 244, and into threaded apertures 270 provided on the front wall 70 of the docking station 14. The slotted apertures 262 enable the stylus holder 244 to be mounted in a non-horizontal orientation (see FIGS. 1, 6, and 10—e.g., having an incline from horizontal of up to about 15 degrees) such that gravity will substantially prevent the stylus 246 from falling out of the stylus holder 244, even under extreme vibration situations. The stylus 246 fits into openings 274 in sidewalls 278 of the stylus holder 244 with a close tolerance fit so that it can be easily inserted and removed. An optional lanyard 286 can also be provided to keep the stylus 246 attached to the docking station 14. The lanyard 286 combined with the inclined mounting angle of the stylus holder 244 prevents the stylus 246 from accidentally falling out of the stylus holder 244.

The stylus holder 244 can alternatively be mounted to a variety of different locations on the docking station 14 depending upon the particular application and mounting arrangement of the docking station 14. FIG. 2 illustrates a pair of threaded apertures 290 that can alternatively be used for mounting the stylus holder 244 to the left sidewall 62. FIG. 6 illustrates a pair of threaded apertures 294 that can alternatively be used for mounting the stylus holder 244 to the right sidewall 66.

Figure 10:
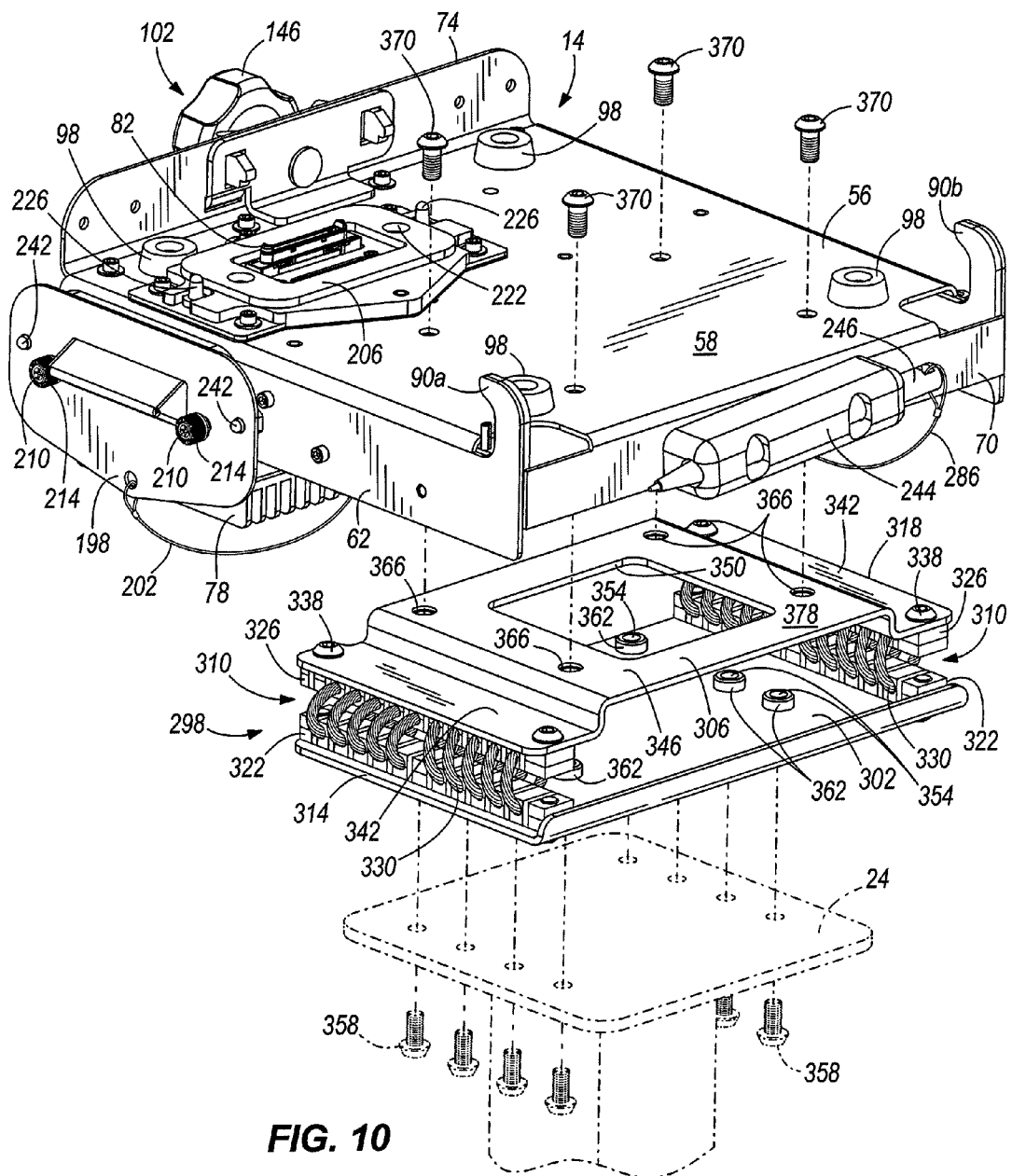
FIG. 10 is an exploded view of the docking station of FIG. 1, an isolator assembly, and a mounting support.
Figure 11:
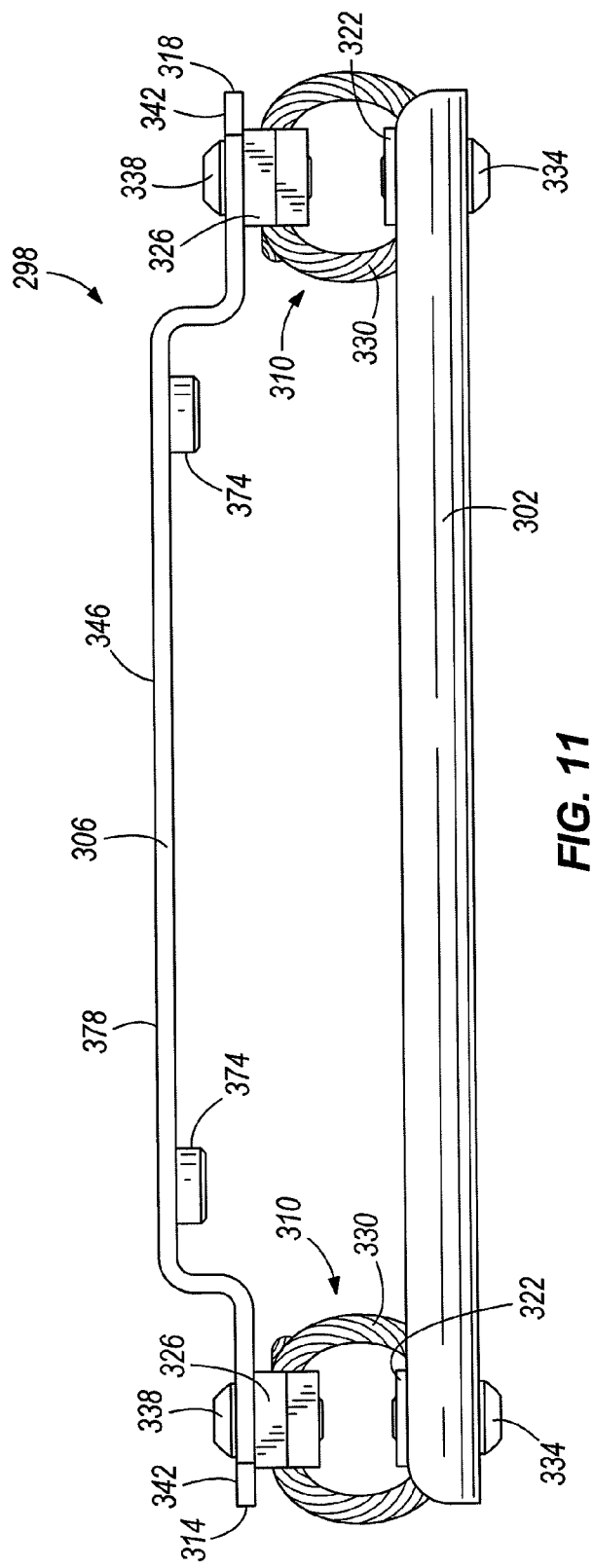
FIG. 11 is an end view of the isolator assembly shown in FIG. 10.

Referring now to FIGS. 10 and 11, the docking station 14 can be mounted to the support surface 24 with an isolator assembly 298 designed to dampen the large shock loading often experienced by off-road and military vehicles. As shown in FIG. 10, the isolator assembly 298 is sandwiched between the underside of the horizontal wall 56 of the docking station 14 and the support surface 24.

The isolator assembly 298 includes a first or lower plate 302 configured to be coupled to the support surface 24, and a second or upper plate 306 configured to be coupled to the docking station 14. One or more wire rope isolators 310 are coupled between the first and second plates 302, 306 to reduce or prevent forces exerted on the first plate 302 from being transmitted to the second plate 306. Such forces include the shock forces experienced by the vehicle and transmitted to the support surface 24 via its connection to the vehicle. In the illustrated embodiment, two wire rope isolators 310 are coupled between the plates 302, 306, with one isolator 310 positioned adjacent a first end 314 of the isolator assembly 298 and the other isolator 310 positioned adjacent a second end 318 of the isolator assembly 298 opposite the first end 314. The isolators 310 are helical wire rope isolators available from Vibration Mounting Controls, Inc. of Bloomingdale, N.J. as part number C6R-h-310-12. The R in the part number signifies that the isolator is RoHS compliant. Of course, other sizes and configurations of wire rope isolators can be substituted depending upon the particular loading conditions to be expected with a particular docking station application.

Each isolator 310 includes opposing base portions 322, 326 through which a wire rope 330 (e.g., braided stainless steel wire rope) is helically received. The base portion 322 is secured to the first plate 302 via fasteners 334. The base portion 326 is secured to the second plate 306 via fasteners 338. Forces exerted on the first plate 302 are dampened by flexure of the wire rope 330 to substantially isolate the second plate 306 from forces (e.g., shock loading) exerted on the first plate 302. In the illustrated embodiment, the second plate 306 includes first portions 342 lying in a first plane and a second portion 346 lying in a second plane offset from the first plane in a direction away from the first plate 302. An aperture 350 is defined in the second portion 346 for accessibility and weight reduction. The base portions 326 of the isolators 310 are coupled to the respective first portions 342 of the second plate 306.

The first plate 302 includes a plurality of threaded bores 354 for receiving respective fasteners 358 to couple the first plate 302, and therefore the isolator assembly 298, to the support surface 24. In the illustrated embodiment, the threaded bores 354 are defined by eight inserts 362 (only four are shown in FIG. 10) pressed into holes in the first plate 302. The second plate 306 includes a plurality of threaded bores 366 for receiving respective fasteners 370 to couple the docking station 14 to the second plate 306, and therefore to the isolator assembly 298. In the illustrated embodiment, the threaded bores 366 are defined by four inserts 374 (only two are shown in FIG. 11) pressed into holes in the second plate 306. The second plate 306 includes a surface 378 facing in a direction away from the first plate 302. Each threaded bore 366 is open to the surface 378 for receiving a fastener 370 in a direction from the second plate 306 toward the first plate 302. This facilitates easy installation of the docking station 14 onto the isolator assembly 298 because the four fasteners 370 can be inserted from the top side of the horizontal surface 58. The user need not access the underside of the docking station 14, the isolator assembly 298, or the support surface 24 to mount the docking station 14 to the isolator assembly 298 once the isolator assembly 298 has been mounted on the support surface 24. Likewise, the docking station 14 can be easily removed from the isolator assembly 298 without uncoupling the first plate 302 from the support surface 24.

The mounting process incorporating the isolator assembly 298 will now be described. First, the assembled isolator assembly 298 is mounted to the support surface 24 by passing the fasteners 358 up through the support surface 24 from its underside as shown in FIG. 10 and into the threaded bores 354. Fewer than all eight fasteners 358 and bores 354 can be used, which permits some flexibility in the mounting location on the support surface 24. Next, the docking station 14 is mounted to the isolator assembly 298 by passing the fasteners 370 down through the top surface 58 and into the threaded bores 366 in a direction toward the mounting surface 24. This mounting sequence is greatly improved over mounting sequences for prior art isolators assemblies, which require the upper and lower plates of the isolator assemblies to be separated/disassembled in order to complete the mounting, and which require inserting fasteners from the underside of the isolator assembly in an upward direction toward and into the docking station.

Various features and advantages of the invention are set forth in the following claims.

What is claimed is:

1. A computer docking station for supporting and electrically coupling to a portable computer, the computer docking station comprising:
    a wall having a first surface, a second surface facing oppositely from the first surface, and an aperture extending through the wall from the first surface to the second surface;
    a securing member having a body portion configured to be positioned adjacent the first surface of the wall and a securing projection coupled to the body portion, the securing projection sized and configured to selectively extend through the aperture in the wall, beyond the second surface of the wall, and into a securement recess of the computer to secure the computer to the docking station; and
    an adjustment mechanism coupled with the body portion of the securing member, the adjustment mechanism operable to move the securing member relative to the wall between a first position, in which the securing projection is positioned to extend into the securement recess of the computer, and a second position, in which the securing projection is positioned to not extend into the securement recess of the computer.

2. The computer docking station of claim 1, wherein the adjustment mechanism includes a knob.

3. The computer docking station of claim 2, wherein the adjustment mechanism includes a threaded rod, the knob being rotatably mounted on the threaded rod and having threads engageable with the threads on the rod such that rotation of the knob moves the securing member between the first and second positions.

4. The computer docking station of claim 1, further comprising a biasing member positioned between the first surface of the wall and the body portion of the securing member, the biasing member biasing the securing member toward the second position.

5. The computer docking station of claim 4, wherein the biasing member is a leaf spring.

6. The computer docking station of claim 5, wherein the leaf spring includes spaced-apart tabs configured to engage the body portion to prevent rotation of the leaf spring relative to the body portion.

7. The computer docking station of claim 1, wherein the securing projection includes a pair of spaced-apart securing projections sized and configured to be selectively received in respective spaced-apart securement recesses of the computer.

8. The computer docking station of claim 1, further including a locking arrangement for locking the securing member in the first position.

9. The computer docking station of claim 8, wherein the locking arrangement includes an arm on the securing member having a slot for selectively receiving a tab extending from the first surface of the wall, the tab having an aperture sized and configured for receiving a lock, such that when the securing member is in the first position, the tab is received in the slot such that the lock can be received in the aperture of the tab to lock the securing member in the first position.

10. The computer docking station of claim 1, wherein the wall is adjacent a first end of the computer docking station, the computer docking station further including a second securing projection adjacent a second end of the computer docking station that is opposite the first end for engaging a second securement recess of the computer.

11. A computer docking station for supporting and electrically coupling to a portable computer, the computer docking station comprising:
    a base;
    an electrical connector coupled to the base and configured to electrically connect to the portable computer; and
    a cover removably connected to the base to selectively cover the electrical connector, the cover sealingly engaging the base around the electrical connector to substantially prevent the ingress of contaminants toward the electrical connector between the base and the cover.

12. The computer docking station of claim 11, wherein one of the cover and the base includes a gasket configured to sealingly engage the other of the cover and the base around the electrical connector.

13. The computer docking station of claim 12, wherein the gasket is fixed to the base.

14. The computer docking station of claim 11, wherein the cover includes fasteners configured to cooperate with the base to selectively secure the cover to the base in a first position covering the electrical connector.

15. The computer docking station of claim 14, wherein the fasteners further cooperate with the base to selectively secure the cover to the base in a second position spaced from the electrical connector to permit mounting of a computer to the computer docking station.

16. The computer docking station of claim 15, wherein the base includes a first surface and a second surface generally perpendicular to the first surface, and wherein the cover is secured to the first surface of the base when in the first position, and is secured to the second surface of the base when in the second position.

17. The computer docking station of claim 14, wherein the fasteners are threaded fasteners configured to be received in corresponding threaded apertures in the base.

18. The computer docking station of claim 11, further comprising a tether coupling the cover to the base.

19. The computer docking station of claim 11, wherein the base includes one of a positioning projection and a guide aperture, and wherein the cover includes the other of the positioning projection and the guide aperture, the positioning projection sized and configured to be received in the guide aperture to align the cover with the base for covering the electrical connector.

20. The computer docking station of claim 11, wherein the cover defines a chamber configured to at least partially receive the electrical connector, the chamber being defined by a portion of the cover that is generally V-shaped in cross-section.

21. The computer docking station of claim 11, further comprising a stylus holder mounted to the base in a non-horizontal orientation.

22. An isolator assembly for use with a computer docking station, the isolator assembly comprising:
   a first plate configured to be coupled to a support surface;
   a second plate configured to be coupled to the computer docking station; and
   a wire rope isolator coupled between the first and second plates to reduce transmission of forces from the first plate to the second plate.

23. The isolator assembly of claim 22, wherein the wire rope isolator is a first wire rope isolator, and further comprising a second wire rope isolator coupled between the first and second plates, the first wire rope isolator positioned adjacent a first end of the isolator assembly and the second wire rope isolator positioned adjacent a second end of the isolator assembly opposite the first end.

24. The isolator assembly of claim 22, wherein the wire rope isolator is a helical wire rope isolator.

25. The isolator assembly of claim 22, wherein the first plate further includes a plurality of threaded bores for receiving respective fasteners to couple the first plate to the support surface.

26. The isolator assembly of claim 22, wherein the second plate further includes a plurality of threaded bores for receiving respective fasteners to couple the second plate to the computer docking station.

27. The isolator assembly of claim 26, wherein the second plate includes a surface facing in a direction away from the first plate and wherein each threaded bore is open to the surface for receiving a fastener in a direction from the second plate toward the first plate.

28. The isolator assembly of claim 22, wherein the second plate includes a first portion lying in a first plane and a second portion lying in a second plane offset from the first plane in a direction away from the first plate.

29. The isolator assembly of claim 28, wherein the wire rope isolator is coupled to the first portion of the second plate.

30. A computer docking station assembly for supporting and electrically coupling to a portable computer, the computer docking station assembly comprising:
   a docking station having a base configured to support and electrically couple to the portable computer;
   an isolator assembly including a first plate configured to be coupled to a support surface, a second plate spaced apart from the first plate and configured to be removably coupled to the computer docking station, and an isolator mechanism disposed between the first plate and the second plate to reduce transmission of forces from the first plate to the second plate; and
   a fastener that removably couples the base to the second plate, wherein the fastener is configured to be removed from the base and the second plate so that the base can be uncoupled from the second plate without uncoupling the first plate from the support surface.

31. The computer docking station assembly of claim 30, wherein the fastener is configured to be removed from the base and the second plate in a direction away from the first plate.

32. The computer docking station assembly of claim 30, wherein the isolator mechanism is a wire rope isolator.

* * * * *